US011888981B2

(12) United States Patent
Androulaki et al.

(10) Patent No.: US 11,888,981 B2
(45) Date of Patent: Jan. 30, 2024

(54) PRIVACY PRESERVING AUDITABLE ACCOUNTS

(71) Applicant: International Business Machines Corporation, Armonk, NY (US)

(72) Inventors: Elli Androulaki, Zurich (CH); Kaoutar El Khiyaoui, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 17/404,230

(22) Filed: Aug. 17, 2021

(65) Prior Publication Data

US 2023/0057898 A1 Feb. 23, 2023

(51) Int. Cl.
*H04L 9/08* (2006.01)
*H04L 9/32* (2006.01)
*H04L 9/30* (2006.01)

(52) U.S. Cl.
CPC ............ *H04L 9/088* (2013.01); *H04L 9/30* (2013.01); *H04L 9/3247* (2013.01)

(58) Field of Classification Search
CPC ......... H04L 9/088; H04L 9/30; H04L 9/3247; H04L 9/3218; H04L 63/0421; H04L 63/12; H04L 9/50
USPC ........................................................ 713/171
See application file for complete search history.

(56) References Cited

U.S. PATENT DOCUMENTS

| 10,298,395 | B1* | 5/2019 | Schiatti ................. H04L 9/3218 |
| 2019/0034923 | A1* | 1/2019 | Greco ................... G06Q 20/389 |
| 2022/0014502 | A1* | 1/2022 | Gauthier .................. H04L 9/30 |
| 2023/0208640 | A1* | 6/2023 | El Khiyaoui ........... H04L 9/085 |
| | | | 713/168 |

FOREIGN PATENT DOCUMENTS

| CN | 112418834 A | 2/2021 |
| CN | 115705571 A | 2/2023 |
| JP | 2023027775 A | 3/2023 |

OTHER PUBLICATIONS

Androulaki et al., "Privacy-preserving auditable token payments in a permissioned blockchain system", AFT '20, Oct. 21-23, 2020, New York, NY, USA, 13 pages.
Ben-Sasson et al., "Zerocash: Decentralized Anonymous Payments from Bitcoin", 2014 IEEE Symposium on Security and Privacy, pp. 459-474.

(Continued)

*Primary Examiner* — Jacob Lipman
(74) *Attorney, Agent, or Firm* — Nicholas A. Welling

(57) ABSTRACT

An approach for privacy-preserving auditable accounts on blockchain networks. The approach may include encoding tokens associated with a blockchain network. The encoding may include data relating to the current epoch, where an epoch is a specific time range. The tokens may be received from a user for inspection by an auditing entity. The approach may include performing an audit check on the encoded tokens. If the audit check succeeds, the auditing entity may submit an audit transaction verifying the tokens were generated in the current epoch and making the tokens auditable for the next epoch.

18 Claims, 7 Drawing Sheets

(56) References Cited

OTHER PUBLICATIONS

Garman et al., "Accountable Privacy for Decentralized Anonymous Payments", International Conference on Financial Cryptography and Data Security, Springer, Berlin, Heidelberg, 2016, Jun. 26, 2016, 28 pages.
Kang et al., "FabZK: Supporting Privacy-Preserving, Auditable Smart Contracts in Hyperledger Fabric", 2019 49th Annual IEEE/IFIP International Conference on Dependable Systems and Networks (DSN), 13 pages.
Li et al., "BPCEX: Towards Blockchain-based Privacy-preserving Currency Exchange", 2020 IEEE International Conference on Blockchain and Cryptocurrency (ICBC), Toronto, ON, Canada, pp. 1-9.
Maxwell, Gregory, "CoinJoin: Bitcoin privacy for the real world", bitcointalk.org, Aug. 2013, 6 pages, <https://bitcointalk.org/index.php?topic=279249.0>.
Mell et al., "The NIST Definition of Cloud Computing", Recommendations of the National Institute of Standards and Technology, Special Publication 800-145, Sep. 2011, 7 pages.
Naganuma et al., "Auditable Zerocoin", 2017 IEEE European Symposium on Security and Privacy Workshops (EuroS&PW), IEEE, 2017, pp. 59-63.
Narula et al., "zkLedger: Privacy-Preserving Auditing for Distributed Ledgers", this paper is included in the Proceedings of the 15th USENIX Symposium on Networked Systems Design and Implementation (NSDI '18), Apr. 9-11, 2018, Renton, WA, USA, 17 pages.
Poelstra et al., "Confidential Assets", Financial Cryptography and Data Security, vol. 10958 of LNCS, pp. 43-63. Springer, 2018.

\* cited by examiner

PRIVACY PRESERVING AUDITABLE ACCOUNTS

BACKGROUND

The present disclosure relates generally to the field of blockchain transaction processing, and more specifically to auditing blockchain transactions, while preserving privacy of user's transactions.

A blockchain is a distributed ledger comprised of multiple nodes within a peer-to-peer network. Each node has an identical copy of the ledger, making the blockchain a decentralized system, because there is no central authority controlling administration of the blockchain. A block in the blockchain is a "transaction" which is recorded by adding an additional block to the chain of blocks, linked together through a cryptographic means. Each block within the blockchain contains a hash of the previous block, a timestamp, and transaction data, up to the genesis block at the start of the blockchain. Adding a block to the blockchain requires nodes to follow a consensus protocol (e.g., proof-of-work, proof-of-stake, etc.) in order to validate new blocks.

Blockchains can be permissioned or permissionless. Permissioned blockchains are private blockchains in which a node must be validated in some manner before it can access or make changes to the blockchain. In some permissioned blockchains, parties within the blockchain may be restricted from accessing portions of the blockchain or participating in bi-lateral or multi-lateral transactions. Permissionless block chains are typically open source in nature and allow anyone with an internet connection to send transactions and participate in the execution of the consensus protocol.

SUMMARY

Embodiments of the present disclosure include a computer-implemented method, system, and computer program for privacy-preserving auditable accounts. Embodiments may include, generating at least one token, wherein the at least one token is encoded with an owner, a type, a value a current epoch, transferability, a seed, and a r value, wherein an epoch is a specific time range. Further, embodiments may include generating a zero-knowledge proof, wherein the zero-knowledge proof denotes the owner of the at least one token is a registered user of a blockchain network. Additionally, embodiments may include assembling a first transaction message, wherein the transaction message comprises the at least one token, zero-knowledge proof, and a public key of an issuer. Also, embodiments may include signing the first transaction message, wherein the signature is based on a private key associated with the issuer's public key and broadcasting the transaction message to the blockchain network.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
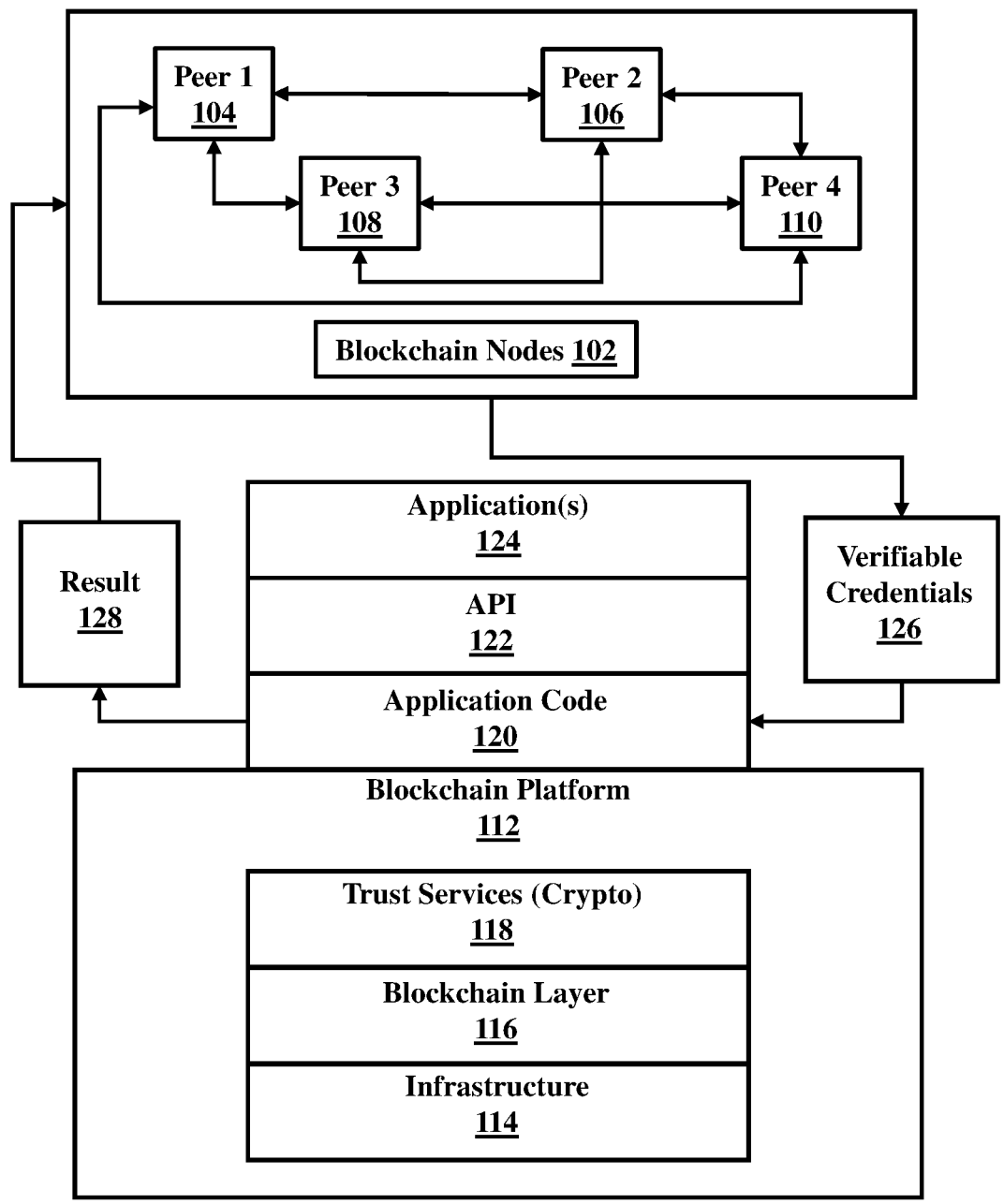
FIG. 1A illustrates an example blockchain architecture, generally designated 100, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of preserving privacy in blockchain transactions, and more specifically to privacy-preserving token exchange via a blockchain with accounting services. Distributed ledger technology ("DLT") has given rise to dis-intermediated token systems. These systems allow end-users to exchange tokens without a central authority. Consensus mechanisms underlying DLT's guarantee the correctness of the of the data in the ledger and the finality of the exchanges. However, decentralization raises privacy concerns: by design, anyone with access to the ledger can read the history of users' transactions. This has created an active area of research focusing on obfuscating users' transactions without sacrificing verifiability. That is, nodes which maintain the ledger can still validate transactions even if the content of the transactions is hidden.

In an embodiment, a zero-knowledge proof may be used to hide the content of a transaction. Zero-knowledge proofs provide a method to achieve the goal of verifying transactions while hiding the content of the transactions from unauthorized viewers on the blockchain network. Hiding the content of the transaction should not prevent auditing and transaction monitoring by authorized parties. For example, anti-money laundering regulations require banks to inspect suspicious transactions and prevent the suspicious transactions from being finalized, if necessary.

Embodiments of the present invention may provide an approach which enables users to transact privately on a blockchain network, while allowing an auditor or monitoring agent to perform accounting tasks. More specifically, an authorized party can learn the quantity of tokens a user receives within an epoch. If a user does not declare all of the tokens within their possession each epoch, any undeclared tokens will be burned and lost.

Before turning to the Figures, it will be readily understood that the instant components, as generally described and illustrated in the Figures herein, may be arranged and designed in a wide variety of different configurations. Accordingly, the following detailed description of the embodiments of at least one of a method, apparatus, computer readable medium and system, as represented in the attached Figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the Figures, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Detailed herein are a method, system, and computer program product that utilize specialized blockchain components to allow for privacy preserving transactions that can be audited on a blockchain network.

In some embodiments, the method, system, and/or computer program product utilize a decentralized database (such as a blockchain) that is a distributed storage system, which includes multiple nodes that communicate with each other. The decentralized database may include an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency.

In various embodiments, a permissioned and/or a permission-less blockchain can be used. In a public, or permission-less, blockchain, anyone can participate without a specific identity (e.g., retaining anonymity). Public blockchains can involve native cryptocurrency and use consensus based on various protocols such as Proof of Work or Proof of Stake. Whereas a permissioned blockchain database provides secure interactions among a group of entities that share a common goal, but which do not fully trust one another, such as businesses that exchange funds, goods, (private) information, and the like.

Further, in some embodiments, the method, system, and/or computer program product can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode (such as managing access to a different blockchain, a bridging blockchain client, etc.). In some embodiments, the method, system, and/or computer program product can further utilize smart contracts that are trusted distributed applications that leverage tamper-proof properties of the blockchain database and an underlying agreement between nodes, which is referred to as an endorsement or endorsement policy.

An endorsement policy allows chaincode to specify endorsers for a transaction in the form of a set of peer nodes that are necessary for endorsement. When a client sends the transaction to the peers (e.g., endorsers) specified in the endorsement policy, the transaction is executed to validate the transaction. After validation, the transactions enter an ordering phase in which a consensus protocol is used to produce an ordered sequence of endorsed transactions grouped into blocks.

In some embodiments, the method, system, and/or computer program product can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node that submits a transaction-invocation to an endorser (e.g., peer), and broadcasts transaction-proposals to an ordering service (e.g., ordering node).

Another type of node is a peer node which can receive client submitted transactions, commit the transactions, and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing/confirming transactions and modifying a world state of the blockchain, which is another name for the initial blockchain transaction which normally includes control and setup information.

In some embodiments, the method, system, and/or computer program product can utilize a ledger that is a sequenced, tamper-resistant record of all state transitions of a blockchain. State transitions may result from chaincode invocations (e.g., transactions, transfers, exchanges, etc.) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database that maintains a current state of the blockchain.

In some embodiments, the method, system, and/or computer program product described herein can utilize a chain that is a transaction log that is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (e.g., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated) upon peer node startup, and before transactions are accepted.

Some benefits of the instant solutions described and depicted herein include a method, system, and computer program product for implementing new, novel blockchain components that utilize zero-knowledge proofs to preserve user privacy while allowing for audits of transactions on a blockchain network. The exemplary embodiments solve the issues of preserving user privacy while allowing for auditing or monitoring agents to perform necessary tasks.

It is noted that blockchain is different from a traditional database in that blockchain is not a central storage, but rather a decentralized, immutable, and secure storage, where nodes may share in changes to records in the storage. Some properties that are inherent in blockchain and which help implement the blockchain include, but are not limited to, an immutable ledger, smart contracts, security, privacy, decentralization, consensus, endorsements, accessibility, and the like, which are further described herein. According to various aspects, the system described herein is implemented due to immutable accountability, security, privacy, permitted decentralization, availability of smart contracts, endorsements and accessibility that are inherent and unique to blockchain.

In particular, the example embodiments provide numerous benefits over a traditional database. For example, through the blockchain, the embodiments provide for immutable accountability, security, privacy, permitted decentralization, availability of smart contracts, endorsements and accessibility that are inherent and unique to the blockchain.

Meanwhile, a traditional database could not be used to implement the example embodiments because it does not bring all parties on the network, it does not create trusted collaboration and does not provide for an efficient commitment of transactions involving verifiable credentials. The traditional database does not provide for tamper proof storage and does not provide for preservation of asset related costs (e.g., computing costs, such as processing power, fees, etc.) if an asset exchange is interrupted. Thus, the proposed embodiments described herein utilizing blockchain networks cannot be implemented by the traditional database.

Turning now to FIG. 1A, illustrated is a blockchain architecture 100, in accordance with embodiments of the present disclosure. In some embodiments, the blockchain architecture 100 may include certain blockchain elements, for example, a group of blockchain nodes 102. The blockchain nodes 102 may include one or more blockchain nodes, e.g., peers 104-110 (these four nodes are depicted by example only). These nodes participate in a number of activities, such as a blockchain transaction addition and validation process (consensus). One or more of the peers 104-110 may endorse and/or recommend transactions based on an endorsement policy and may provide an ordering service for all blockchain nodes 102 in the blockchain architecture 100. A blockchain node may initiate a blockchain authentication and seek to write to a blockchain immutable ledger stored in blockchain layer 116, a copy of which may also be stored on the underpinning physical infrastructure 114. The blockchain configuration may include one or more applications 124 which are linked to application programming interfaces (APIs) 122 to access and execute stored program/application code 120 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 104-110.

The blockchain base or platform 112 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 116 may expose an interface that provides access to the virtual execution environment necessary to process the program code and engage the physical infrastructure 114. Cryptographic trust services 118 may be used to verify transactions such as asset exchange transactions and keep information private.

The blockchain architecture 100 of FIG. 1A may process and execute program/application code 120 via one or more interfaces exposed, and services provided, by blockchain platform 112. The application code 120 may control blockchain assets. For example, the application code 120 can store and transfer data, and may be executed by peers 104-110 in the form of a smart contract and associated chaincode with conditions or other code elements subject to its execution. As a non-limiting example, smart contracts may be generated to execute the transfer of assets/resources, the generation of assets/resources, etc. The smart contracts can themselves be used to identify rules associated with authorization (e.g., asset transfer rules, restrictions, etc.), access requirements (e.g., of a datastore, of an off-chain datastore, of who may participate in a transaction, etc.), and/or usage of the ledger. For example, the verifiable credentials 126 may be processed by one or more processing entities (e.g., virtual machines) included in the blockchain layer 116. The result 128 may include a plurality of linked shared documents (e.g., with each linked shared document recording the issuance of a smart contract in regard to the verifiable credentials 126 being committed by a selected group of peers based on an asset exchange schema, issuer policy, etc.). In some embodiments, the physical infrastructure 114 may be utilized to retrieve any of the data/information/assets/etc. described herein.

A smart contract may be created via a high-level application and programming language, and then written to a block in the blockchain. The smart contract may include executable code that is registered, stored, and/or replicated with a blockchain (e.g., a distributed network of blockchain peers). A transaction is an execution of the smart contract code that can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details (e.g., thus committing a transaction associated with assets, etc.).

Figure 1B:
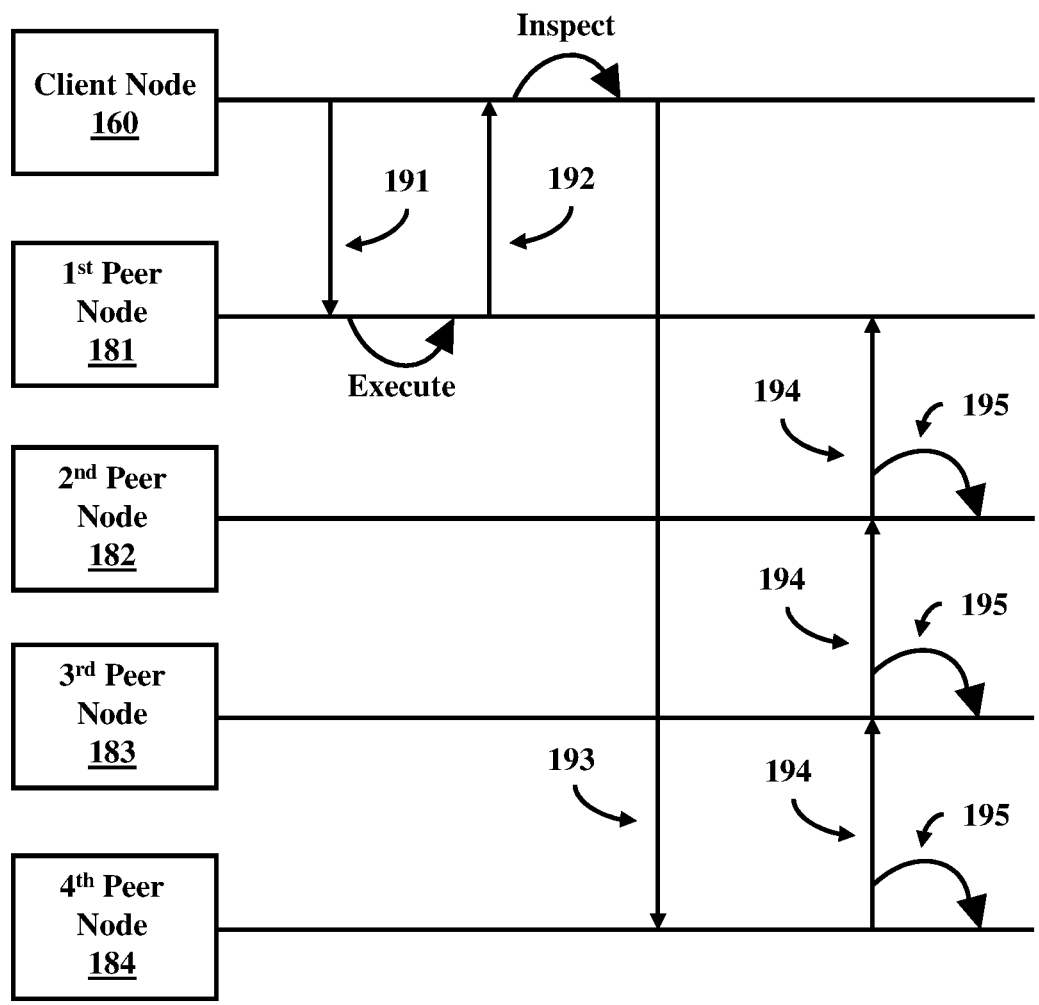
FIG. 1B illustrates a blockchain transactional flow, generally designated 150, in accordance with embodiments of the present disclosure.

FIG. 1B illustrates an example of a blockchain transactional flow 150 between nodes of the blockchain in accordance with an example embodiment. Referring to FIG. 1B, the transaction flow may include a transaction proposal 191 sent by an application client node 160 to an endorsing peer node 181 (e.g., in some embodiments, the transaction proposal 191 may include a schema that prescribes a selected set of peers [peer nodes 181-184] to be used for a specific transaction). The endorsing peer node 181 may verify the client signature and execute a chaincode function to initiate the transaction. The output may include the chaincode results, a set of key/value versions that were read in the chaincode (read set), and the set of keys/values that were written in chaincode (write set). The proposal response 192 is sent back to the client node 160 along with an endorsement signature, if approved. The client node 160 assembles the endorsements into a transaction payload 193 and broadcasts it to an ordering service node 184. The ordering service node 184 then delivers ordered transactions as blocks to all peer nodes 181-183 on a channel. Before committal to the blockchain, each peer node 181-183 may validate the transaction. For example, the peers may check the endorsement policy to ensure that the correct allotment of the specified peers have signed the results and authenticated the signatures against the transaction payload 193 (e.g., all the specified peers from the schema have validated and approved commitment of the transaction to the blockchain).

Referring again to FIG. 1B, the client node 160 initiates the transaction proposal 191 by constructing and sending a request to the peer node 181, which in this example is an endorser. The client node 160 may include an application leveraging a supported software development kit (SDK), which utilizes an available API to generate a transaction proposal 191. The proposal is a request to invoke a chaincode function so that data can be read and/or written to the ledger. The SDK may reduce the package of the transaction proposal 191 into a properly architected format (e.g., protocol buffer over a remote procedure call (RPC)) and take the client's cryptographic credentials to produce a unique signature for the transaction proposal 191.

In response, the endorsing peer node 181 may verify (a) that the transaction proposal 191 is well formed, (b) the transaction has not been submitted already in the past (replay-attack protection), (c) the signature is valid, and (d) that the submitter (client node 160, in the example) is properly authorized to perform the proposed operation on that channel. The endorsing peer node 181 may take the transaction proposal 191 inputs as arguments to the invoked chaincode function. The chaincode is then executed against a current state database to produce transaction results including a response value, read set, and write set. However, no updates are made to the ledger at this point. In some embodiments, the set of values, along with the endorsing peer node's 181 signature is passed back as a proposal response 192 to the SDK of the client node 160 which parses the payload for the application to consume.

In response, the application of the client node 160 inspects/verifies the endorsing peers signatures and compares the proposal responses to determine if the proposal response is the same. If the chaincode only queried the ledger, the application would inspect the query response and would typically not submit the transaction to the ordering service node 184. If the client application intends to submit the transaction to the ordering service node 184 to update the ledger, the application determines if the specified endorsement policy has been fulfilled before submitting. Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in the transaction payload step 193, the client node 160 assembles endorsements into a transaction and broadcasts the transaction proposal 191 and response within a transaction message to the ordering node 184. The transaction may contain the read/write sets, the endorsing peers signatures and a channel ID (e.g., if a specific [off-chain] datastore is to be utilized). The ordering node 184 does not need to inspect the entire content of a transaction in order to perform its operation, instead the ordering node 184 may simply receive transactions from all channels in the network, order them chronologically by channel, and create blocks of transactions per channel.

The blocks of the transaction are delivered from the ordering node 184 to all peer nodes 181-183 on the channel. The transactions 194 within the block are validated to ensure any endorsement policy is fulfilled and to ensure that there have been no changes to ledger state for read set variables since the read set was generated by the transaction execution. Transactions in the block are tagged as being valid or invalid. Furthermore, in steps 195 each peer node 181-183 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 2:
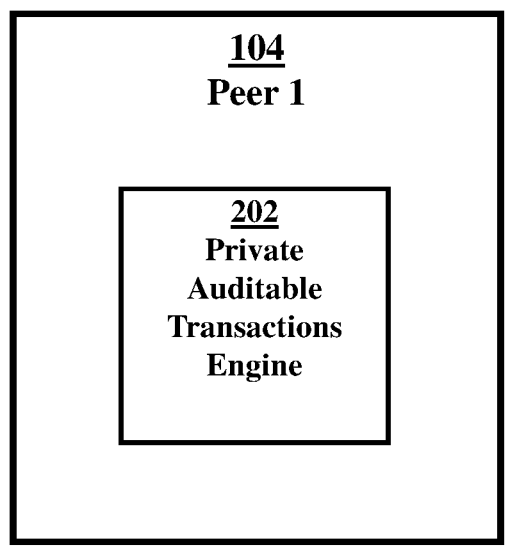
FIG. 2 illustrates an example system for auditable privacy preserving blockchain transactions, generally designated 200, in accordance with embodiments of the present disclosure.

Referring now to FIG. 2, illustrated is an example blockchain network 200 for privacy preservation of auditable transactions, in accordance with embodiments of the present disclosure. In some embodiments, the blockchain network comprises private auditable transactions engine 202 operational on peer 1 104. Private auditable transactions engine 202 is a computer program that can generate and/or execute private auditable transactions operational on a permissioned or permissionless blockchain network. While private auditable transactions engine 202 is shown operational on peer 1 104, private auditable transactions engine 202 can be operational on one or more blockchain nodes 102 (e.g., peer 2 106, peer 3 108, and peer 4 110) within the blockchain network. Further, one or more private auditable transactions engines 202 can be located as a separate node within the blockchain network and within a specific channel of the blockchain network. Each peer within the blockchain network can function in one or more roles within the private auditable transactions service.

In some embodiments, private auditable transactions engines 202 set up an epochs and keep a world clock associated with each epoch. An epoch is a pre-determined amount of time in which a transaction can fall (e.g., one hour, two hours, one day, etc.). For example, one or more nodes can be responsible for keeping and maintaining the world clock associated with the blockchain networks. The world clock can be based around a single time zone or a running 24 hour clock initialized at a given time. Further, the peer nodes responsible for maintaining the world clock can send out a notification when an epoch ends and update the blockchain accordingly.

In some embodiments, private auditable transactions engines 202 can generate a token associated with a transaction. The tokens generated within a transaction can hide the owner of the tokens in an unspent transaction output based methodology. For example, a set of tokens from a payee block can be the input tokens. The input tokens must be traceable to a previous transaction. The input tokens must be the same type as the output tokens that are to be generated by private auditable transactions engine 202. The total value of the input tokens must be the same as the output tokens to be generated. The owner of the input tokens must provide a private key to sign off on the transaction. The input tokens must not have been consumed in a previous transaction.

In an embodiment, private auditable transactions engine 202 can generate an output token in the following manner. It should be noted, the following example only refers to one output token from one input token for simplicity sake. More than one token can be generated during a transaction by private auditable transaction engine 202. A token can be a piece of data which contains the following:

$$Tok=commit(owner,type,value,e,transferrable,seed,r)$$

wherein commit is a hiding component, e is the identifier of the current epoch. Transferrable is a Boolean term indicating whether the token is transferrable or not. Seed is a random seed used to generate the token's serial number, and r is a blinding factor.

In an embodiment, private auditable transaction engine 202 can audit tokens. One or more nodes within the blockchain network can occupy the role of auditor (e.g., peer 2 106, peer 3 108). For example, at the end of each epoch, a user's present tokens received during each epoch. An auditor can check the token for freshness. Freshness is an indication of whether the token was generated in the most recent epoch that closed. In the immediate example above, the auditor would check e in the token. If the auditor determines the token is fresh, it can update the status of the token to transferrable. If the auditor determines the token is not fresh, it can update the status of the token to non-transferrable. In some cases, the non-transferrable token is essentially useless and thus, burned.

In an embodiment, private auditable transaction engine 202 can generate a zero-knowledge proof to show the owner is registered and the token encodes the proper information. For example, the issuer can be a node in the blockchain network which issues zero-knowledge proof $\psi$ to show the token encodes owner, token type, value, e, false, and r.

In an embodiment, private auditable transaction engine 202 can be configured to allow the issuer to add a signature to a message and submit a signed transaction. For example, the message may contain tok, type, $\psi$ and $pk_I$ ($pk_I$ refers to the issuer's public key). Thus, the signed transaction can be as follows:

$$Tx=(issue,tok,owner,type,value,\psi,pkI,\sigma)$$

In an embodiment, private auditable transaction engine 202 can be configured to allow an auditor node to verify the transaction by checking if 1) the issue is within its permissions to create the "type" of token; 2) $\sigma$ is valid under public key $pk_I$; and 3) $\psi$ is a valid zero-knowledge proof.

In an embodiment, private auditable transaction engine 202 can be configured to generate a transaction which transfers ownership of a token. For example, an input token can be an output token from a previous transaction, where the input token has been rerandomized. For example, the original token with no associated epoch can be as follows: Tok=commit (owner, type, value, true, - -, seed, r), and the original token can be rerandomized in the following manner, tok'=commit (owner', type, value, false, e, seed', r'). Where the owner is the new owner, e is the current epoch seed' and r' are random numbers. Further, private auditable transaction engine 202 can generate a new serial number for the randomized token. For example, the token serial number can be as follows: sn=VRF (sk, seed) where VRF is a verifiable pseudo-random function and sk is the owner's secret key. A VRF provides a publicly verifiable proof of the correctness of the output.

In an embodiment, private auditable transaction engine 202 can be configured to generate a zero-knowledge proof by the owner of a token. A zero-knowledge proof can comprise one or more of the following. Tok" is a randomization of a valid token, tok' is generated correctly, (i.e., it preserves the type and value of the token and transferrable is set to false, the epoch is the current epoch). The owner is a registered user of the blockchain network. Sn has been computed correctly (i.e., sn is computed using the secret key of the owner and seed encoded in tok").

In an embodiment, private auditable transaction engine 202 can be configured to allow the owner of the token to generate an anonymous signature, which shows the signer knows the owner of the token's secret key. For example, let anonymous signature be $\sigma$ on message (sn, tok", tok', $\psi$). $\sigma$ shows that the signer knows the secret key of the owner in tok". The transfer transaction would correspond to the following Tx=(transfer, sn, tok", tok', $\psi$, $\sigma$).

In an embodiment, private auditable transaction engine 202 can be configured to allow for users to account for tokens at the end of the epoch. For example, for each token a user owns, it can provide the following to an auditor:

owner, value, type, e, seed, and r. The auditor can check if the owner is the user and if the token is the output of a valid transaction which matches the provided data. If the provided data is valid, the auditor can mark the tokens as inspected.

In an embodiment, private auditable transaction engine 202 can be configured to allow an auditor to change the data within the inspected token. For example, the auditor may change a presented token from tok=commit (owner, value, type, e, false, seed, r) to tok'=commit (owner, value, type, --, true, seed, r') in which the epoch is not associated with the token and the Boolean value of whether the token may be transferred to another user is set to true. Additionally, the overall transaction of the accounting may be as follows: tx=(account, tok, tok', $\psi$, $\sigma$). Whereby, $\Psi$ is a zero knowledge proof that shows that tok' encodes the same information as tok except that it is transferrable and its epoch is redacted, and $\sigma$ is the auditor's signature on message (account, tok, tok', $\psi$).

In an embodiment, private auditable transaction engine 202 can be configured to allow a merge and split tokens without changing the ownership of the tokens. For example, the auditor can monitor the last time in which a user participated in an account session in the current epoch. In this example, the Boolean transferrable can be removed or inferred from the presence of the epoch field. If the epoch field has been set by the auditor, the token cannot be spent, but if the epoch field is null, the token can be spent. Further, private auditable transaction engine 202 can be configured to allow for the auditor to monitor and batch multiple tokens in one account transaction allowing for multi-lateral transactions to occur in sequence.

In an embodiment, private auditable transaction engine 202 can be configured to merge and split transactions and tokens. For example, a user can hide the number of transactions it participated in in the current epoch by merging or splitting the transactions or tokens. The transactions can have the following properties: transferrable Boolean is set to false, the owner in outputs is the same as the inputs, and epoch in the outputs is the same as the inputs. Thus, the data associated with any token and transaction will be hidden from auditor and other participants of the network, as it will only look as if it was previously owned by the user.

It is noted, that as embodied in FIG. 2 and throughout this specification, that as implemented, the novelty presented is multiplicative.

Figure 3:
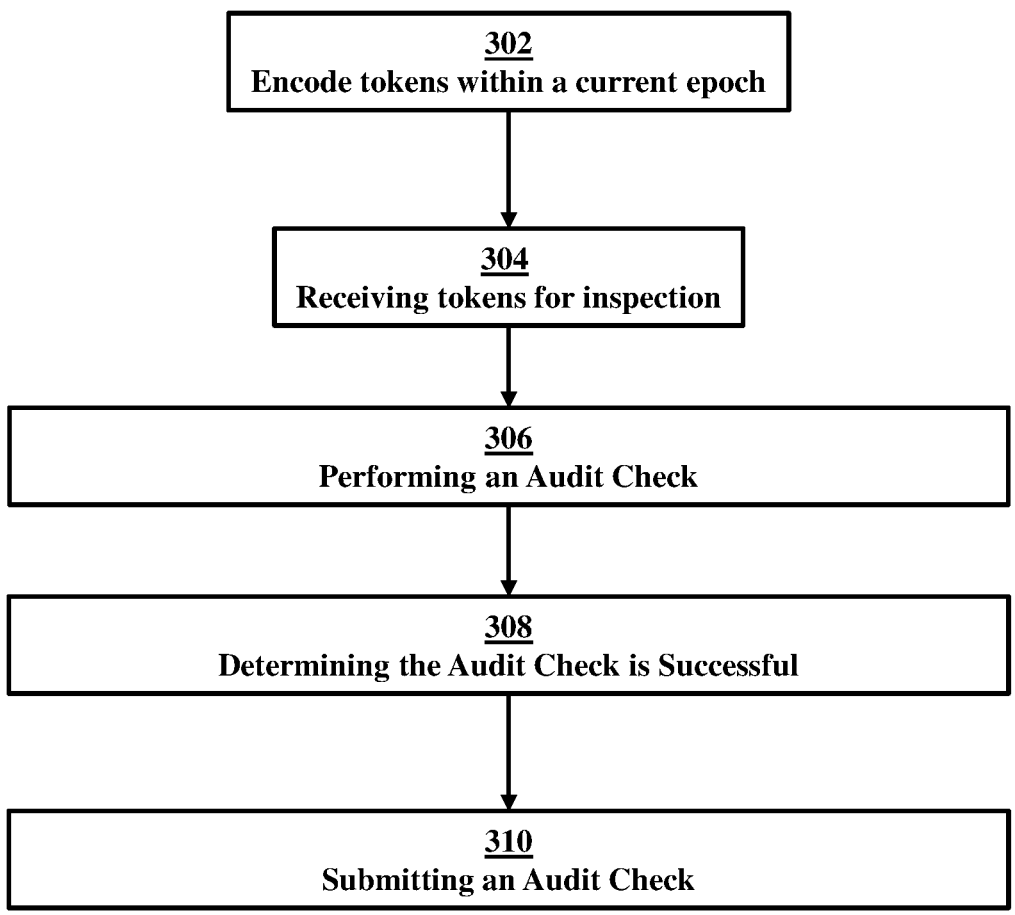
FIG. 3 illustrates a flowchart of an example method for auditable privacy preserving blockchain transaction, generally designated 300, in accordance with embodiments of the present disclosure.

Referring now to FIG. 3, illustrated is a flowchart of an example method 300 of privacy preserving auditable blockchain transactions. In some embodiments, the method 300 may be performed by a processor, node, and/or peer node in a blockchain network (such as the blockchain network 200 of FIG. 2).

In some embodiments, the method 300 proceeds to step 302, where the processor encodes tokens within a current epoch, via a peer (e.g., peer 1 104, peer 2 106, peer 3 108, peer 4 110) within blockchain architecture 100. For example, private auditable transactions engine 202 can allow a user to encode an input token received within a current epoch into an output token denoting it was received in the current epoch.

In some embodiments, the method 300 proceeds to step 304, where one or more tokens are received for inspection, via a peer within blockchain architecture 100. For example, private auditable transactions engine 202 can be configured to allow an auditor node to receive tokens from a user of a blockchain network.

In some embodiments, the method 300 proceeds to step 306, where an auditing node performs an audit check of the received tokens. For example, private auditable transactions engine 202 can be configured to allow for an auditing node within a blockchain network to perform an audit check of the received tokens, wherein the auditing node can check to determine if the token is transferrable and was generated in the most recent epoch.

In some embodiments, the method 300 proceeds to step 308, where private auditable transactions engine 202 can be configured to determine if the audit check by the auditing node was successful. For example, if the auditing node determines the encoded tokens are from a valid transaction (e.g., the token is transferrable and generated in the most recent epoch), the audit check can be determined successful. Further, an auditing node can determine whether a user is the owner of the token via a zero-knowledge proof, encoded by the user in step 302.

In some embodiments, the method 300 proceeds to step 310, where private auditable transactions engine 202 can be configured to submit the auditing check. For example, an auditing node can provide a signature for the audit check, allowing the tokens to be included in a transaction that may be appended to the ledger of the blockchain network.

In some embodiments, discussed below, there are one or more operations of the method 300 not depicted for the sake of brevity.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4A:
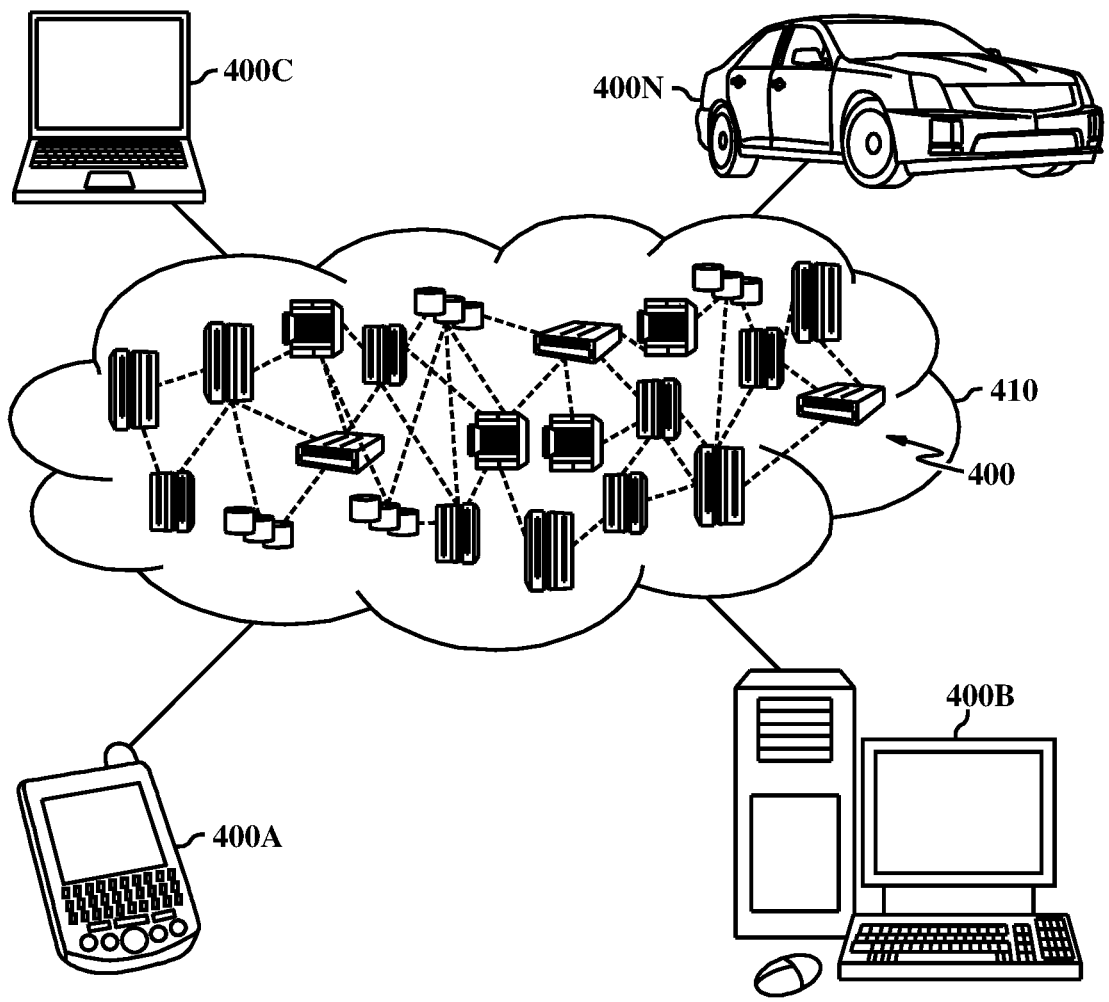
FIG. 4A illustrates a cloud computing environment, in accordance with embodiments of the present disclosure.

FIG. 4A, illustrated is a cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof.

This allows cloud computing environment 410 to offer infrastructure, platforms and/or software as services for which a cloud consumer does not need to maintain resources on a local computing device. It is understood that the types of computing devices 400A-N shown in FIG. 4A are intended to be illustrative only and that computing nodes 400 and cloud computing environment 410 can communicate with any type of computerized device over any type of network and/or network addressable connection (e.g., using a web browser).

Figure 4B:
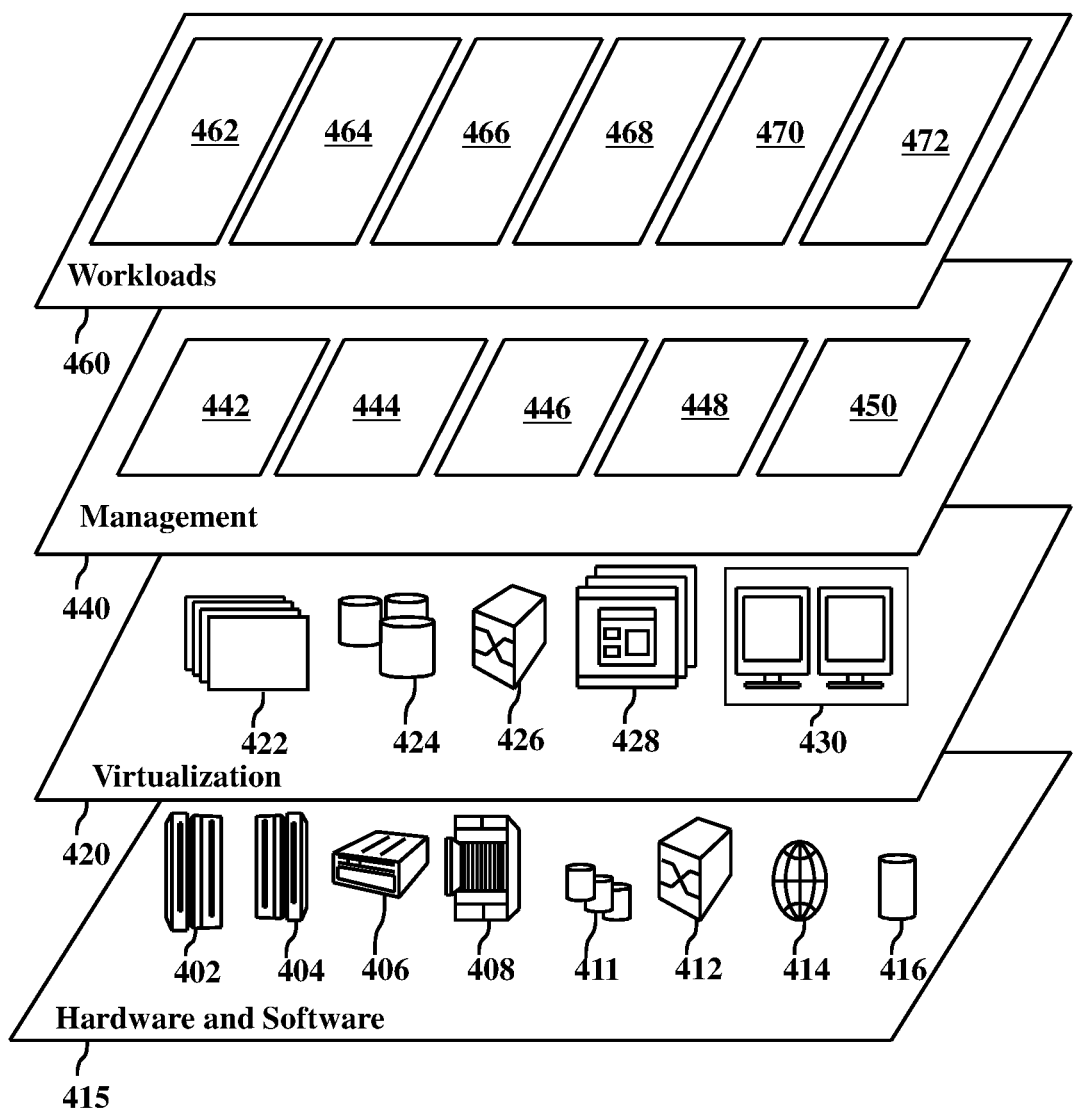
FIG. 4B illustrates abstraction model layers, in accordance with embodiments of the present disclosure.

FIG. 4B, illustrated is a set of functional abstraction layers provided by cloud computing environment 410 (FIG. 4A) is shown. It should be understood in advance that the components, layers, and functions shown in FIG. 4B are intended to be illustrative only and embodiments of the disclosure are not limited thereto. As depicted below, the following layers and corresponding functions are provided.

Hardware and software layer 415 includes hardware and software components. Examples of hardware components include: mainframes 402; RISC (Reduced Instruction Set Computer) architecture based servers 404; servers 406; blade servers 408; storage devices 411; and networks and networking components 412. In some embodiments, software components include network application server software 414 and database software 416.

Virtualization layer 420 provides an abstraction layer from which the following examples of virtual entities may be provided: virtual servers 422; virtual storage 424; virtual networks 426, including virtual private networks; virtual applications and operating systems 428; and virtual clients 430.

In one example, management layer 440 may provide the functions described below. Resource provisioning 442 provides dynamic procurement of computing resources and other resources that are utilized to perform tasks within the cloud computing environment. Metering and Pricing 444 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 446 provides access to the cloud computing environment for consumers and system administrators. Service level management 448 provides cloud computing resource allocation and management such that required service levels are met. Service Level Agreement (SLA) planning and fulfillment 450 provide pre-arrangement for, and procurement of, cloud computing resources for which a future requirement is anticipated in accordance with an SLA.

Workloads layer 460 provides examples of functionality for which the cloud computing environment may be utilized. Examples of workloads and functions which may be provided from this layer include: mapping and navigation 462; software development and lifecycle management 464; virtual classroom education delivery 466; data analytics processing 468; transaction processing 470; and auditable privacy preserving blockchain transactions 472.

Figure 5:
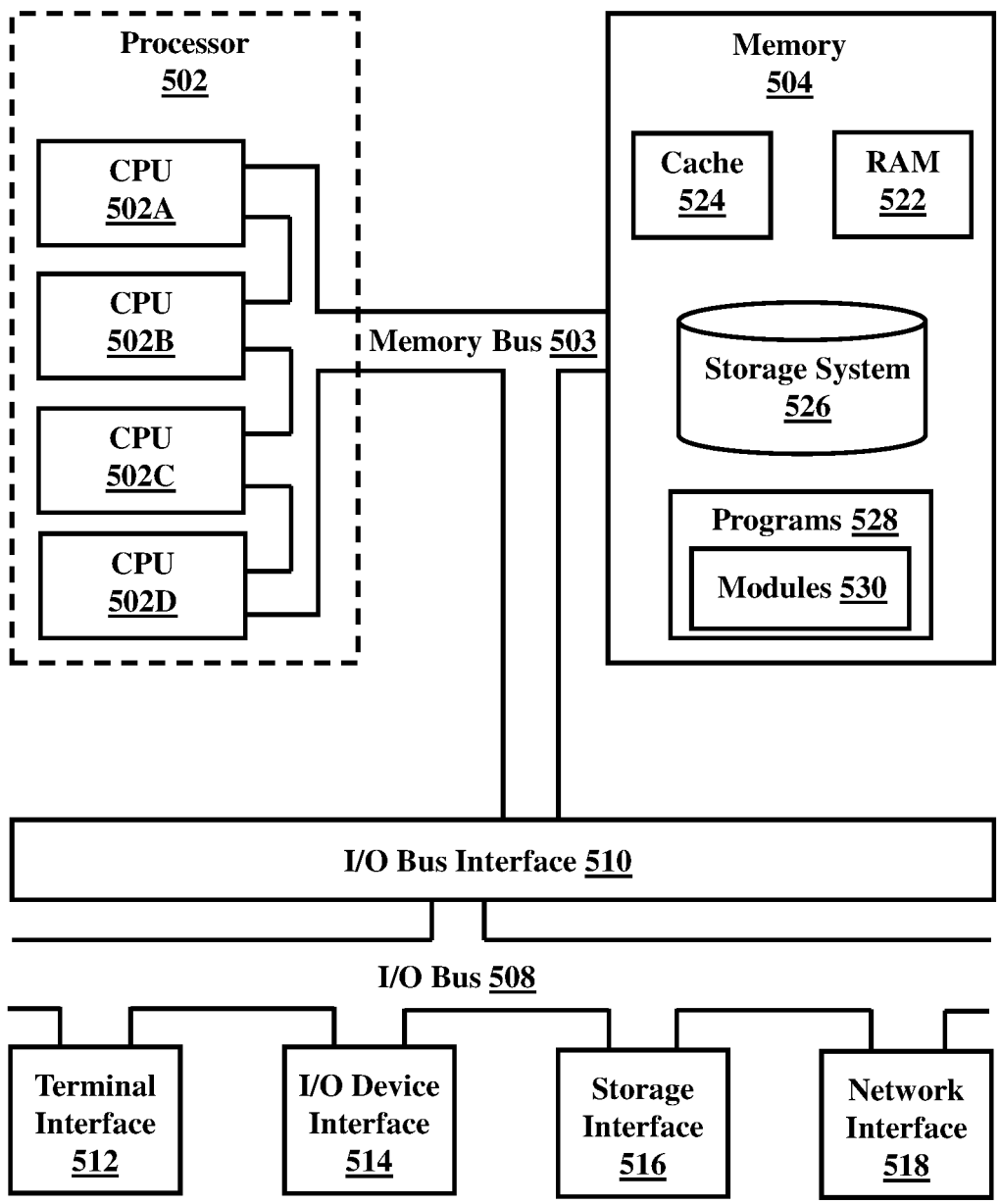
FIG. 5 illustrates a high-level block diagram of an example computer system, generally designated 501, that may be used in implementing one or more of the methods, tools, and modules, and any related functions, described herein, in accordance with embodiments of the present disclosure.

FIG. 5, illustrated is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

System memory 504 may include computer system readable media in the form of volatile memory, such as random access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smartphone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method for privacy-preserving auditable accounts, the method comprising:
   generating at least one token, wherein the at least one token is encoded with an owner identifier, a type, a value, a current epoch, transferability, a seed, and a r value;
   generating a zero-knowledge proof, wherein the zero-knowledge proof denotes the owner of the at least one token is a registered user of a blockchain network;
   assembling a first transaction message, wherein the first transaction message comprises the at least one token, the zero-knowledge proof, and a public key of an issuer;
   signing the first transaction message, wherein the signature is based on a private key associated with the issuer's public key;
   broadcasting the first transaction message to the blockchain network;
   transferring the ownership of one or more tokens, wherein transferring comprises consuming tokens to be transferred and creating one or more tokens with the same value and type of the input tokens, and which encode the current epoch, a second seed, and a second r value, the new owner identifier and a bit that indicates that they are not transferable yet;

generating a token serial number for each of the one or more input tokens;

generating a second zero-knowledge proof to show the input tokens are transferrable and that the newly created tokens are not; and generating a second anonymous signature for the transaction, wherein the second anonymous signature demonstrates the signer knows a secret key of the owner of the one or more input tokens.

2. The computer-implemented method of claim 1, further comprising:

verifying the transaction message.

3. The computer-implemented method of claim 2, wherein verification comprises:

determining if the issuer is authorized to create the type of token corresponding to the token in the transaction message;

determining if the issuer's signature is valid, wherein the signature is checked against the public key in the transaction message; and determining if the zero knowledge proof is valid.

4. The computer-implemented method of claim 1, wherein transfer further comprises:

assembling a second transaction message, comprising the token serial number the second zero knowledge proof, and the newly-created tokens one or more tokens; and signing the second transaction message.

5. The computer-implemented method of claim 4, further comprising:

validating the second transaction message, wherein validating is based at least in part on determining if the one or more newly created tokens within the second transaction message have been encoded with the current epoch and are not transferable yet.

6. The computer implemented method of claim 5, further comprising:

responsive to validating the second transaction message, issuing a second account transaction marking the one or more created tokens as transferrable; and account transaction is comprised of a zero-knowledge proof and an auditor's signature.

7. A computer system for privacy-preserving auditable accounts, the system comprising:

a memory; and a processor in communication with the memory, the processor being configured to perform operations comprising:

generate at least one token, wherein the at least one token is encoded with an owner identifier, a type, a value a current epoch, transferability, a seed, and a r value;

generate a zero-knowledge proof, wherein the zero-knowledge proof denotes the owner of the at least one token is a registered user of a blockchain network;

assemble a first transaction message, wherein the first transaction message comprises the at least one token, the zero-knowledge proof, and a public key of an issuer;

sign the first transaction message, wherein the signature is based on a private key associated with the issuer's public key;

broadcast the first transaction message to the blockchain network;

transfer the ownership of one or more tokens, wherein the transfer operations comprise: consume tokens to be transferred and creating one or more tokens with the same value and type of the input tokens, and which encode the current epoch, a second seed, and a second r value, the new owner identifier and a bit that indicates that they are not transferable yet;

generate a token serial number for each of the one or more input tokens;

generate a second zero-knowledge proof to show the input tokens are transferrable and that the newly created tokens are not; and generate a second anonymous signature for the transaction, wherein the second anonymous signature demonstrates the signer knows a secret key of the owner of the one or more input tokens.

8. The computer system of claim 7, further comprising operations to:

verify the transaction message.

9. The computer system of claim 8, wherein the operation of verification comprises:

determine if the issuer is authorized to create the type of token corresponding to the token in the transaction message;

determine if the issuer's signature is valid, wherein the signature is checked against the public key in the transaction message; and determine if the zero knowledge proof is valid.

10. The computer system of claim 7, wherein transfer further comprises operations to:

assemble a second transaction message, comprising the token serial number the second zero knowledge proof, and the newly-created tokens one or more tokens; and sign the second transaction message.

11. The computer-system of claim 10, further comprising operations to:

validating the second transaction message, wherein validating is based at least in part on determining if the one or more newly created tokens within the second transaction message have been encoded with the current epoch and are not transferable yet.

12. The computer system of claim 11, further comprising:

responsive to validating the second transaction message, issue a second account transaction marking the one or more created tokens as transferrable; and account transaction is comprised of a zero-knowledge proof and an auditor's signature.

13. A computer program product for privacy-preserving auditable accounts, the computer program product comprising a computer readable storage medium having program instructions embodied therewith, the program instructions executable by a processor to cause the processors to perform operations, the operations comprising:

generate at least one token, wherein the at least one token is encoded with an owner identifier, a type, a value, a current epoch, transferability, a seed, and a r value;

generate a zero-knowledge proof, wherein the zero-knowledge proof denotes the owner of the at least one token is a registered user of a blockchain network;

assemble a first transaction message, wherein the first transaction message comprises the at least one token, the zero-knowledge proof, and a public key of an issuer;

sign the first transaction message, wherein the signature is based on a private key associated with the issuer's public key;

broadcast the first transaction message to the blockchain network;

transfer the ownership of one or more tokens, wherein the transfer operations comprise: consume tokens to be transferred and creating one or more tokens with the same value and type of the input tokens, and which encode the current epoch, a second seed, and a second r value, the new owner identifier and a bit that indicates that they are not transferable yet;

generate a token serial number for each of the one or more input tokens;

generate a second zero-knowledge proof to show the input tokens are transferrable and that the newly created tokens are not; and generate a second anonymous signature for the transaction, wherein the second anonymous signature demonstrates the signer knows a secret key of the owner of the one or more input tokens.

14. The computer program product of claim 13, further comprising operations to:

verify the transaction message.

15. The computer program product of claim 14, wherein the operation of verification comprises:

determine if the issuer is authorized to create the type of token corresponding to the token in the transaction message;

determine if the issuer's signature is valid, wherein the signature is checked against the public key in the transaction message; and determine if the zero knowledge proof is valid.

16. The computer program product of claim 13, wherein transfer further comprises operations to:

assemble a second transaction message, comprising the token serial number the second zero knowledge proof, and the newly-created tokens one or more tokens; and sign the second transaction message.

17. The computer program product of claim 16, further comprising operations to:

validate the second transaction message, wherein validating is based at least in part on determining if the one or more newly created tokens within the second transaction message have been encoded with the current epoch and are not transferable yet.

18. The computer program product of claim 17, further comprising:

responsive to validating the second transaction message, issue a second account transaction marking the one or more created tokens as transferrable; and account transaction is comprised of a zero-knowledge proof and an auditor's signature.

* * * * *